May 12, 1942.  C. AMBRUSTER  2,282,923
TEMPERATURE CONTROL OF STORAGE BATTERIES
Filed June 4, 1940

WITNESS:

INVENTOR
Cornelius Ambruster
BY
Augustus B. Stoughton
ATTORNEY.

Patented May 12, 1942

2,282,923

UNITED STATES PATENT OFFICE 2,282,923

TEMPERATURE CONTROL OF STORAGE BATTERIES

Cornelius Ambruster, Roslyn, Pa., assignor to The Electric Storage Battery Company, Philadelphia, Pa., a corporation of New Jersey Application June 4, 1940, Serial No. 338,681

1 Claim. (Cl. 136—161)

The principal object of the present invention is to eliminate from apparatus for controlling the temperature of storage batteries by means of heat absorbers and temperature exchangers, the hazard existing in cases where the potential difference between the ends of the battery may be present in the circulating system provided between the heat absorbers and the exchange element; another object of the invention is to improve the temperature exchange between the exchange elements.

Other objects of the invention will appear from the following description at the end of which the invention will be claimed.

Generally stated, the invention comprises temperature exchange elements and small groups of heat absorbers respectively arranged in corresponding small groups of cells, and means connecting the respective temperature exchange elements with the small groups of heat absorbers, and a temperature exchange element common to the first mentioned temperature exchange elements, and means for circulating a current of air in respect to all the temperature exchange elements, whereby the potential difference across each group is less than the potential difference across the battery.

The invention also comprises the improvements to be presently described and finally claimed.

Figure 1:
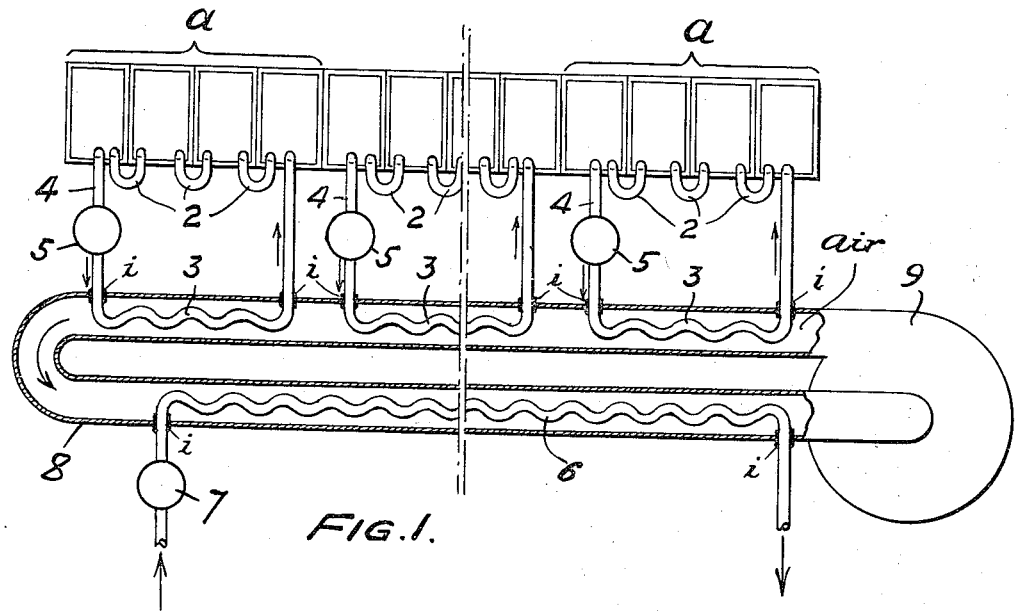
Figure 2:
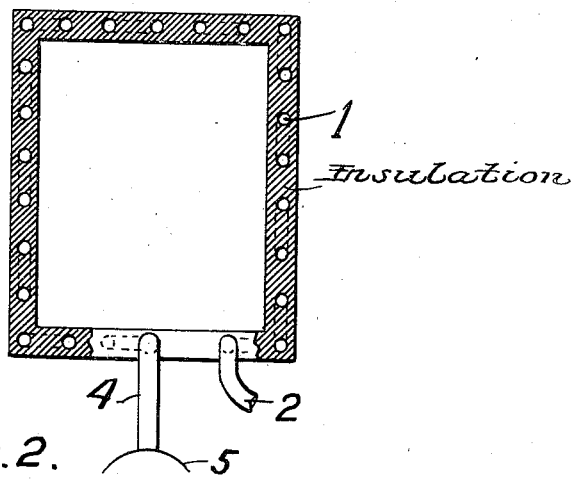

In the following description reference will be made to the accompanying drawing forming part hereof and in which, Figure 1 is a diagrammatic and schematic view of apparatus embodying features of the invention; and Figure 2 is a sectional view of a cell illustrating the preferred arrangement of the heat absorbers in each cell.

Referring to the drawing, and more particularly to Figure 1, a indicates a small group of cells of the battery shown and in which the elements are connected in series. The number of cells in the group may be increased or diminished but the potential difference across the end cells of each group is comparatively small in respect to the potential difference between the end cells of the battery. Each cell of each group is provided with a heat absorber. As shown in Figure 2 the heat absorbers 1 are buried in the cell walls. The heat absorbers in each group are interconnected in series as indicated by the U-connectors 2. For each group of cells there is a temperature exchange element 3 having connections 4. The connections 3, 4, 1 and 2 constitute a circulating system for a fluid or liquid of which the circulation is produced by the pump 5. The connections 2 and 4 of the circulating system are properly insulated from other metal parts of the system or the connections themselves may be of insulating material. 6 is a temperature exchange element and through it there is a circulation of liquid that may be provided by the pump 7. The fluid circulating through the temperature exchange element 6 may be hot or cold. For example, in the case of submarine use it may be sea water. It follows from this that the liquid circulating through the heat absorbers may be hot or cold and it may consist of fresh water. The temperature exchange elements 3 and 6 are enclosed in a suitable casing 8 which provides a path for the circulation of air induced for example by the blower 9. From the foregoing description it is evident that there is no chance for any considerable potential difference to exist across the ends of the temperature exchange element 3 such as exists between the end cells of the battery and in that way a hazard is eliminated. Again the use of the current of air not only effects efficient temperature exchange but it separates the temperature exchange element 6 in respect to the temperature exchange elements 3 in so far as electrical effects are concerned. The temperature exchange elements 3 and 6 are mutually insulated from each other and from the casing 8 as shown at i in the drawing.

It will be obvious that modifications may be made in details of construction and arrangement without departing from the spirit of the invention which is not limited to such matters or otherwise than the appended claims may require.

I claim:

Apparatus for controlling the temperature of a high potential storage battery having a comparatively large number of cells electrically connected in series, comprising a heat absorber in each cell electrically insulated from the electrolyte of its respective cell, means for mechanically connecting in series the absorbers in adjacent cells in groups to form a plurality of small independent groups of heat absorbers, a temperature exchanger for each group, each exchanger being electrically insulated from the other exchangers, means for connecting each temperature exchanger and its respective group of absorbers to form separate cooling systems, means for circulating cooling fluid through each of said separate systems, an additional temperature exchange element common to all the temperature exchangers of said separate systems, and means for circulating an insulating fluid in respect to all the temperature exchange elements whereby the maximum potential to which the component parts of said temperature controlling apparatus is subjected is substantially less than the battery potential.

CORNELIUS AMBRUSTER.